United States Patent
Kerr, III et al.

(10) Patent No.: US 8,543,748 B2
(45) Date of Patent: Sep. 24, 2013

(54) FIELDBUS DEVICE CONTROL SYSTEM

(75) Inventors: Frank Leon Kerr, III, Roanoke, VA (US); George Andrew Matzko, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 13/229,213

(22) Filed: Sep. 9, 2011

(65) Prior Publication Data

US 2013/0066443 A1 Mar. 14, 2013

(51) Int. Cl.
*G06F 13/00* (2006.01)
*G06F 12/00* (2006.01)
*G06F 13/14* (2006.01)
*G06F 13/38* (2006.01)

(52) U.S. Cl.
USPC ............ 710/107; 710/240; 710/241; 710/244

(58) Field of Classification Search
USPC .................................. 710/107, 240, 241, 244
See application file for complete search history.

(56) References Cited

U.S. PATENT DOCUMENTS

| | | | | |
|---|---|---|---|---|
| 7,346,001 | B1 * | 3/2008 | Zhang et al. ................... | 370/235 |
| 7,346,719 | B2 * | 3/2008 | Ellerbrock et al. ........... | 710/107 |
| 7,603,478 | B2 * | 10/2009 | Thurman et al. .............. | 709/238 |
| 7,609,713 | B2 * | 10/2009 | Ferguson et al. ............. | 370/450 |
| 7,680,970 | B2 * | 3/2010 | Sherriff et al. ................. | 710/240 |
| 7,725,635 | B2 * | 5/2010 | Wei et al. ....................... | 710/244 |
| 7,840,735 | B2 * | 11/2010 | Heller et al. ................... | 710/107 |
| 8,046,086 | B2 * | 10/2011 | Pettus et al. ..................... | 700/9 |
| 8,307,136 | B2 * | 11/2012 | Feiereisel et al. ............. | 710/100 |
| 8,392,008 | B2 * | 3/2013 | Weatherhead et al. .......... | 700/99 |
| 2003/0095568 | A1 * | 5/2003 | Tominaga et al. ............. | 370/466 |
| 2003/0152059 | A1 * | 8/2003 | Odman ........................ | 370/338 |
| 2003/0152105 | A1 * | 8/2003 | Arimilli ........................ | 370/468 |

(Continued)

FOREIGN PATENT DOCUMENTS

| | | | |
|---|---|---|---|
| DE | 102007035159 A1 | * | 1/2009 |
| DE | 102008027935 A1 | * | 12/2009 |
| GB | 2456037 A | * | 7/2009 |
| JP | 2012145975 A | * | 8/2012 |
| WO | WO 9836335 A2 | * | 8/1998 |
| WO | WO 2007039577 A1 | * | 4/2007 |

OTHER PUBLICATIONS

Cavalieri, S.; Di Stefano, A.; Mirabella, O., "Assessment of the priority mechanism in the Fieldbus data link layer," Industrial Electronics, Control and Instrumentation, 1991. Proceedings. IECON '91., 1991 International Conference on , pp. 1673,1678 vol. 3, Oct. 28-Nov. 1, 1991.*

(Continued)

*Primary Examiner* — Faisal M Zaman
(74) *Attorney, Agent, or Firm* — Cantor Colburn LLP

(57) ABSTRACT

A fieldbus system is provided, having a plurality of fieldbus devices and a controller. The controller is in communication with the plurality of fieldbus devices though a fieldbus. The controller transmits a plurality of high priority Receive Process Data Objects (RPDOs) and a plurality of low priority RPDOs to the plurality of fieldbus devices through the fieldbus. The controller includes a control logic for sending each of the plurality of fieldbus devices one of the plurality of high priority RPDOs during a frame. The frame is the fastest rate at which the high priority RPDOs are transmitted. The controller includes a control logic for sending at least one of the plurality of fieldbus devices at least one of the plurality of low priority RPDOs. The low priority RPDOs are grouped by a minimum wait time.

13 Claims, 5 Drawing Sheets

(56) References Cited

U.S. PATENT DOCUMENTS

| | | | |
|---|---|---|---|
| 2003/0214928 A1* | 11/2003 | Chuah | 370/336 |
| 2004/0054829 A1* | 3/2004 | White et al. | 710/105 |
| 2004/0213285 A1* | 10/2004 | Stevenson et al. | 370/465 |
| 2005/0033886 A1* | 2/2005 | Grittke et al. | 710/107 |
| 2005/0066104 A1* | 3/2005 | Train et al. | 710/305 |
| 2005/0201343 A1* | 9/2005 | Sivalingham et al. | 370/338 |
| 2006/0059283 A1* | 3/2006 | Borst et al. | 710/107 |
| 2006/0109864 A1* | 5/2006 | Oksman | 370/474 |
| 2006/0176830 A1* | 8/2006 | Yakashiro | 370/256 |
| 2007/0136731 A1* | 6/2007 | Bennington et al. | 718/103 |
| 2008/0189636 A1* | 8/2008 | Hood et al. | 715/771 |
| 2009/0010205 A1* | 1/2009 | Pratt et al. | 370/328 |
| 2009/0024777 A1* | 1/2009 | Hirotsu et al. | 710/116 |
| 2009/0240383 A1* | 9/2009 | Hung | 701/1 |
| 2010/0088537 A1* | 4/2010 | Hua et al. | 713/600 |
| 2011/0063978 A1* | 3/2011 | Hinosugi et al. | 370/235 |

OTHER PUBLICATIONS

Tao Lin; Zuojun Liu; Hexu Sun; Tao Liang; Zhaoming Lei, "A Variable Priority Token-passing Fieldbus based on Quality of Service," Integration Technology, 2007. ICIT '07. IEEE International Conference on , pp. 639,642, Mar. 20-24, 2007.*

Cavalieri, S.; Di Stefano, A.; Mirabella, O., "Optimization of acyclic bandwidth allocation exploiting the priority mechanism in the FieldBus data link layer," Industrial Electronics, IEEE Transactions on , vol. 40, No. 3, pp. 297,306, Jun. 1993.*

Hasnaoui, S.; Kallel, O.; Kbaier, R.; Ben Ahmed, S., "An implementation of a proposed modification of CAN protocol on CAN fieldbus controller component for supporting a dynamic priority policy," Industry Applications Conference, 2003. 38th IAS Annual Meeting. Conference Record of the , vol. 1, pp. 23,31 vol. 1, Oct. 12-16, 2003.*

* cited by examiner

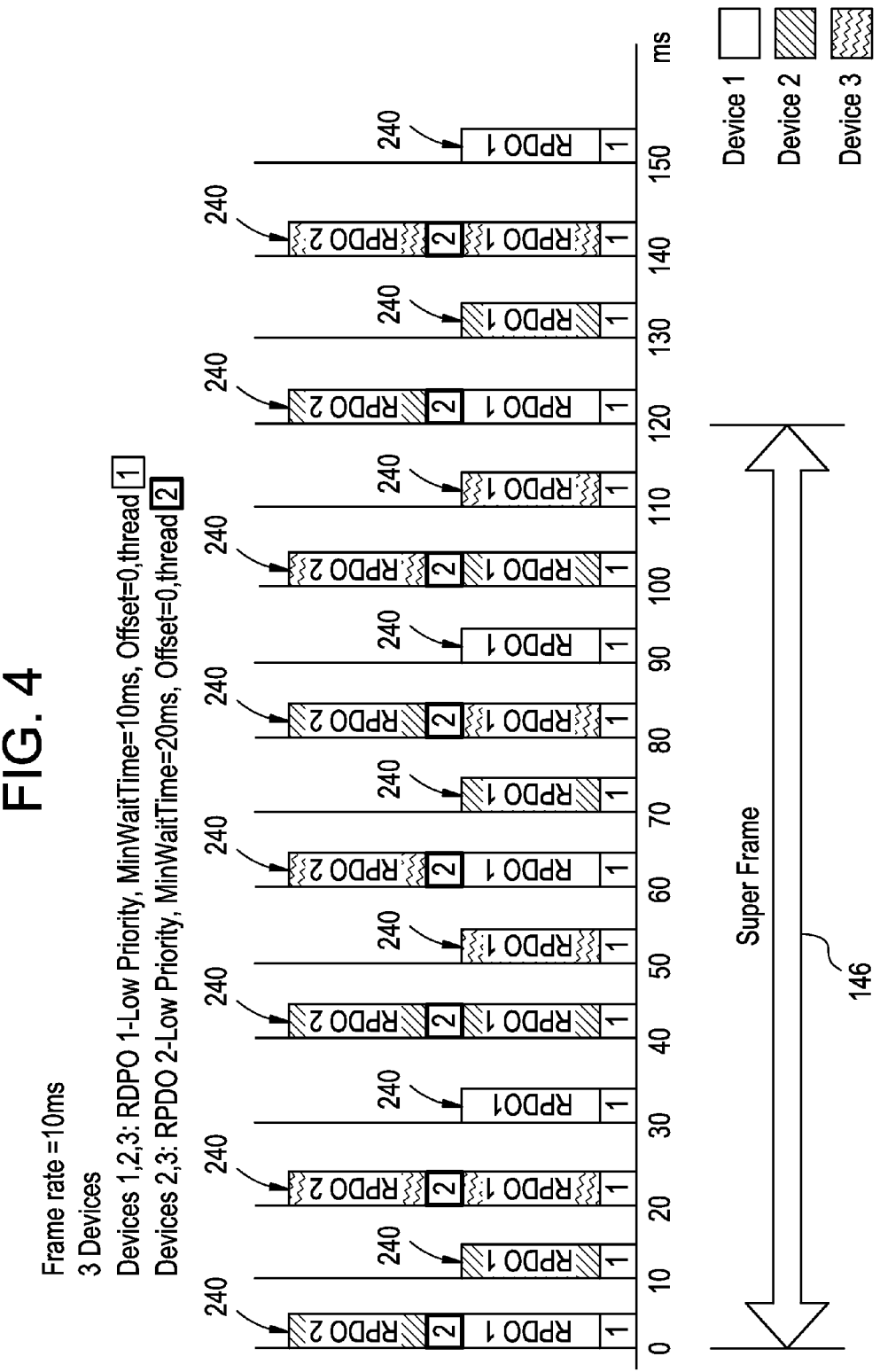

FIELDBUS DEVICE CONTROL SYSTEM

BACKGROUND OF THE INVENTION

The subject matter disclosed herein relates to a fieldbus system, and more specifically to a fieldbus system having a controller transmitting a plurality of high priority Receive Process Data Objects (RPDOs) and low priority RPDOs to a plurality of fieldbus devices.

A fieldbus is employed to monitor and control one or more pieces of production equipment such as, for example, sensors, actuators, electrical motors, or valves. A fieldbus is generally the equivalent of a local area network (LAN) type connection that requires only one communication point at a controller and allows for multiple pieces of production equipment to be connected concurrently. In one example, a transfer data protocol such as, for example, CANopen may be used to allow communication between the controller and the production equipment. Process data objects (PDOs) are used for broadcasting control and status information between the controller and the production equipment. Specifically, in order to communicate data from the controller to the production equipment, a Receive Process Data Object (RPDO) message is used.

The controller sends both high and low priority RPDOs according to a predefined schedule that is based on the specific CANopen configuration and production equipment specifications. Thus, the controller is typically configured with a unique RPDO transmission schedule to accommodate the RPDO transmission schedules of the production equipment. This means a firmware change is needed in the controller each time the specific CANopen configuration or the production equipment is modified. Changing the firmware in the controller each time the CANopen configuration or the production equipment is modified may become time consuming and may also be costly.

BRIEF DESCRIPTION OF THE INVENTION

According to one aspect of the invention, a fieldbus system is provided, having a plurality of fieldbus devices and a controller. The controller is in communication with the plurality of fieldbus devices though a fieldbus. The controller transmits a plurality of high priority Receive Process Data Objects (RPDOs) and a plurality of low priority RPDOs to the plurality of fieldbus devices through the fieldbus. The controller includes a control logic for sending each of the plurality of fieldbus devices one of the plurality of high priority RPDOs during a frame. The frame is the fastest rate at which the plurality of high priority RPDOs are transmitted. The controller includes a control logic for sending, if required, at least one of the plurality of fieldbus devices at least one of the plurality of low priority RPDOs. The low priority RPDOs are grouped by a minimum wait time. The controller includes a control logic for defining, if required, at least one low priority thread. The low priority thread accommodates transmission scheduling of the plurality of low priority RPDOs that have the same minimum wait time. The controller includes a control logic for preventing the low priority thread from executing more than once during a frame. The controller includes a control logic for allowing each of the at least one low priority threads to complete at least once during a sequence of frames referred to as a superframe.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a diagram illustrating yet another embodiment of an RPDO transmitting schedule.

The detailed description explains embodiments of the invention, together with advantages and features, by way of example with reference to the drawings.

DETAILED DESCRIPTION OF THE INVENTION

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
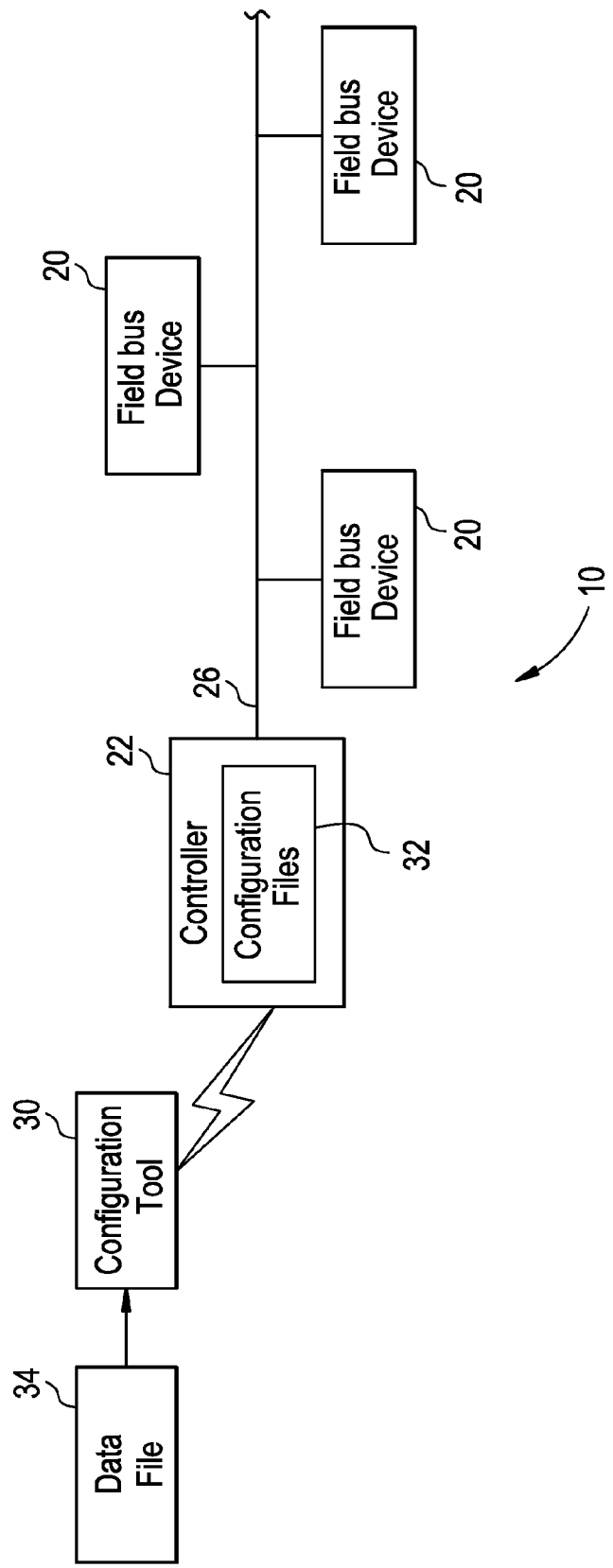
FIG. 1 is a schematic illustration of an exemplary fieldbus system.

Referring now to FIG. 1, an exemplary schematic fieldbus system 10 is illustrated. The fieldbus system 10 includes a plurality of fieldbus devices 20 and a controller 22. The controller 22 is in communication with each of the fieldbus devices 20 through a fieldbus 26. The fieldbus system 10 utilizes a CANopen transfer data protocol to exchange messages between the controller 22 and the fieldbus devices 20. In one exemplary embodiment, the fieldbus system 10 may be used in conjunction with a gas turbine (not shown), where the fieldbus devices 20 are fuel valves for the gas turbine. However, it is understood that the fieldbus system 10 may be employed in a variety of automation applications, and that the fieldbus devices 20 may be any type of production equipment such as, for example, sensors, actuators, electrical motors, or valves.

Process data objects (PDOs) are transmitted over the fieldbus 26 and are used for broadcasting control and status information between the controller 22 and the fieldbus devices 20. Specifically, PDOs are used in CANopen for broadcasting high and low priority control and status information. Data from the fieldbus devices 20 are communicated to the controller using Transmitting Receive Process Data Objects (TPDO) messages, and data from the controller 22 is communicated to the fieldbus devices 20 using Receive Process Data Object (RPDO) messages. In one embodiment, the controller 22 transmits both high priority RPDOs and low priority RPDOs to the fieldbus devices 20 through the fieldbus 26.

In the embodiment as shown in FIG. 1, the controller 22 includes an electrically erasable and reprogrammable memory such as, for example, flash memory that can be erased and reprogrammed repeatedly by a configuration tool 30. The configuration tool 30 includes control logic for creating and transferring one or more configuration files 32 to the controller 22. The configuration tool 30 reconfigures the controller 22, but does not alter the firmware of the controller 22. Specifically, a data file 34 containing information regarding all of the possible fieldbus devices that may be supported by the fieldbus system 10 is loaded by the configuration tool 30.

In one embodiment the data files 34 could include a dynamic link library file extension (i.e. a .DLL file), however, it is understood that the data files 34 could include other file extensions as well. The configuration tool 30 includes an interface for allowing a user to enter input that defines the specific fieldbus devices 20 that are actually supported by the fieldbus system 10. For example, in the exemplary embodiment as shown, a user would select the three fieldbus devices 20 through a user interface (not shown) of the configuration tool 30.

The configuration tool 30 includes control logic for creating the configuration files 32 based on the data files 34 as well as the specific fieldbus devices 20 that were defined by a user. Each configuration file 32 is saved in the memory of the controller 22 and contains information regarding the characteristics of the fieldbus devices 20 that are employed within the fieldbus system 10. The characteristics of the fieldbus devices 20 include the RPDO transmitting schedule of the fieldbus device 20.

Figure 2:
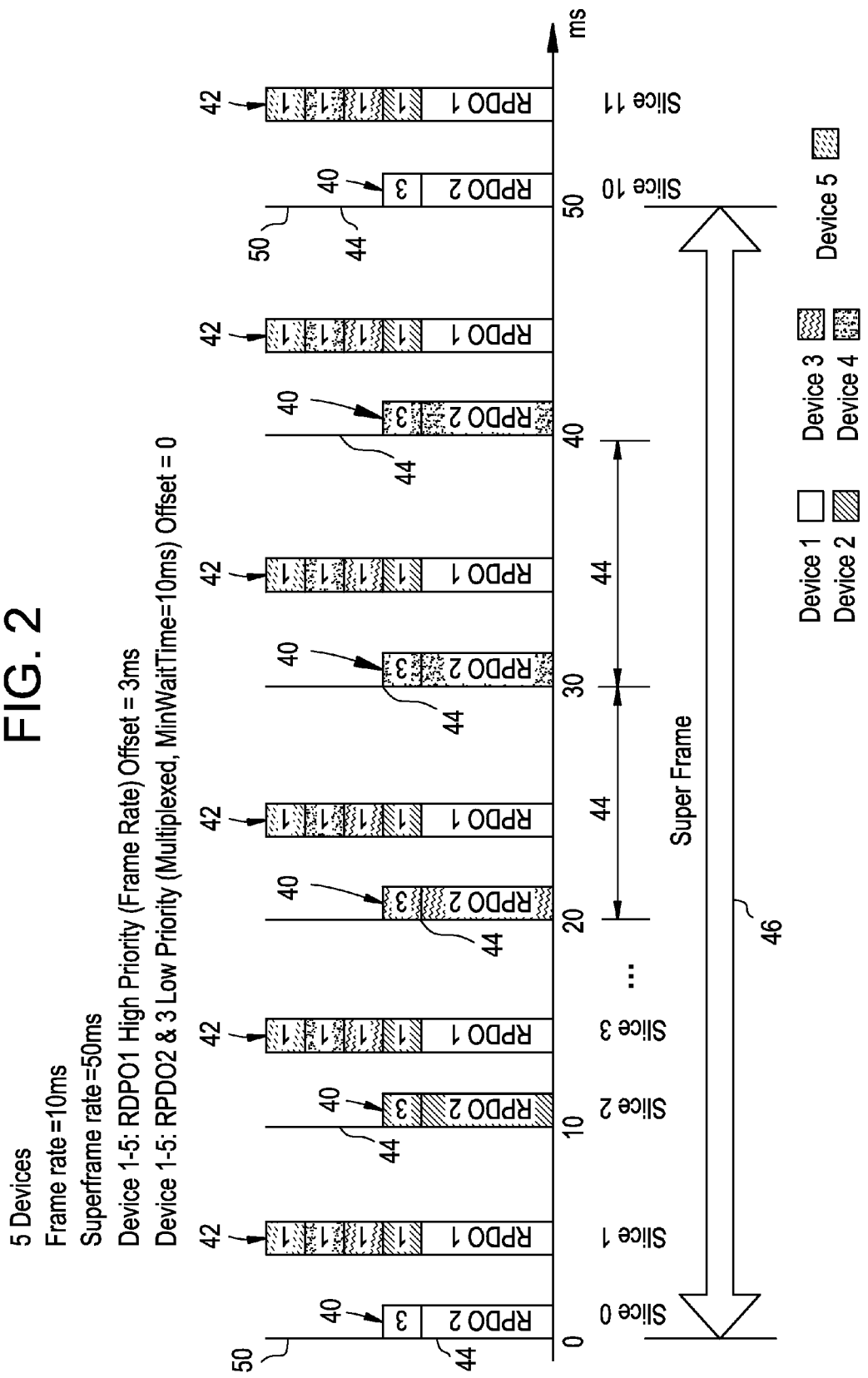
FIG. 2 is a diagram illustrating an exemplary RPDO transmitting schedule generated by a controller shown in FIG. 1.

The controller 22 includes control logic for sending RPDOs to the fieldbus devices 20 according to a specified RPDO transmitting schedule. Turning now to FIG. 2, an exemplary illustration of one type of RPDO transmitting schedule that is generated by a scheduling algorithm of the controller 22 is illustrated. In the embodiment as shown, the fieldbus system 10 employs five different fieldbus device 20, and the controller 22 sends RPDO1, RPDO2 and RPDO3 to the fieldbus devices 20. RPDO1 is a high priority RPDO 42. RPDO2 and RPDO3 are low priority RPDOs that are indicated by reference number 40. The RPDOs 40 and 42 are transmitted by the controller 22 in groups or clusters, which are referred to as slices. The slice with the high priority RPDOs 42 are transmitted only once during a frame 44, and no more. A frame rate is the rate at which the high priority RPDOs 42 are transmitted, and is defined as the base execution rate of the application. In the exemplary embodiment as shown, the frame rate is about 10 ms (milliseconds), however it is to be understood that other frame rates may be used as well. The high priority RPDOs 42 are transmitted to each and every one of the fieldbus devices 20 during each frame 44.

The controller 22 includes control logic for transmitting the low priority RPDOs 40 to the fieldbus devices 20 no more than once a frame 44. In the embodiment as shown, the fieldbus devices 20 each have multiple low priority RPDOs 40, where each of the low priority RPDOs 40 for a single fieldbus device 20 are all transmitted in a single slice. A minimum wait time is associated with the low priority PRDOs 40. In the embodiment as shown in FIG. 2, the minimum wait time is about 10 ms, however it is to be understood that other time periods may be used as well. The low priority RPDOs 40 are grouped by the minimum wait time. The minimum wait time may be the same as, less, or more than the frame rate. However, the low priority RPDOs 40 can not be transmitted more than once a frame 44.

In the exemplary embodiment as shown in FIG. 2, all of the low priority RPDOs 40 have the same minimum wait time. A thread is defined as a sequence of either high priority RPDOs 42 or low priority RPDOs 40 that share the same minimum wait time. During a minimum wait time interval, the low priority RPDOs 40 are transmitted to each of the fieldbus devices 20 one at a time, in a round-robin configuration. That is, the controller 22 includes control logic for assigning an equal amount of time to transmit each of the low priority RPDOs 40, and transmits the RPDOs 40 in a circular order. It should be noted that a low priority RPDO 40 thread repeats no more than once a frame 44, but could take longer than one frame 44 depending on the minimum wait time.

A superframe 46 is defined as the number of frames 44 that are needed for all of the low priority RPDO threads to complete at least at least once. In the exemplary embodiment as shown, the superframe 46 is about 50 ms, however it is to be understood that other time periods may be used as well. In one embodiment, the number of frames 44 in the superframe 46 may be calculated based on the frame rate, the number of high priority RPDOs 42 each fieldbus device 20 receives, the number of low priority RPDOs 40 each fieldbus device 20 receives, and the associated minimum wait times. Specifically, the number of frames 44 in the superframe 46 defines the transmitting schedule of the RPDOs, and may be calculated by the following formula:

$$n_s = \left\{ \left[ LCM\left( \frac{p_{frame}}{p_{MinWait1}}, d_{MinWait1} \right) \middle/ \frac{p_{Frame}}{p_{MinWait1}} \right], \ldots, \left[ LCM\left( \frac{p_{frame}}{p_{MinWait_i}}, d_{MinWait_i} \right) \middle/ \frac{p_{Frame}}{p_{MinWait_i}} \right] \right\}$$

In the equation stated above, $n_s$ is the number of frames 44 in the superframe 46, $d_{MinWait}$ is the number of fieldbus devices 20 with low priority RPDOs 40 that share the same minimum wait time, $p_{frame}$ is the frame rate in ms, $p_{MinWait}$ is the minimum wait time of the low priority RPDOs 40 in ms, i is the number of different minimum wait times between each of the fieldbus devices 20, and LCM is the least common multiple of either $p_{frame}$ divided by $p_{MinWait}$, or $p_{frame}$ divided by $d_{MinWait}$.

A tick is a point in time in which the slices of the RPDOs 40 and 42 are transmitted. For example, in the embodiment as shown in FIG. 2, the tick is about 1 ms interval. The low and high priority RPDOs 40 and 42 may be offset from a frame boundary 50 by a period of time. For example, the transmission of the RPDOs 40 and 42 may be offset from the boundary 50 by an offset value in ticks or milliseconds. The offset value range is between about zero and about the number of ticks in a frame 44 minus one tick. FIG. 2 illustrates the high priority RPDOs 42 with an offset of about 3 ms, and the low priority RPDOs 40 with an offset of about 0 ms.

Figure 3A:
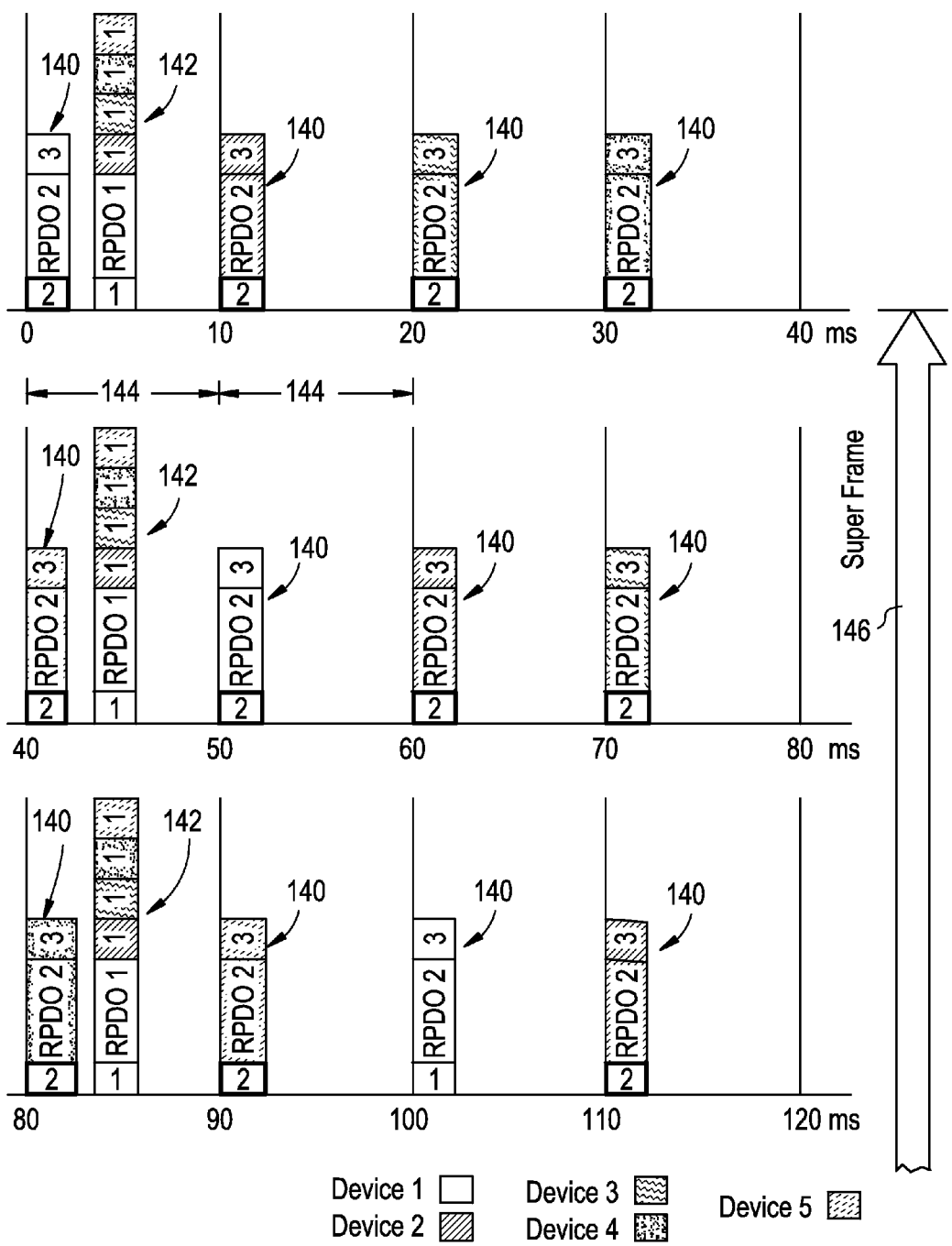
FIGS. 3A-3B are a diagram illustrating another embodiment of an RPDO transmitting schedule.
Figure 3B:
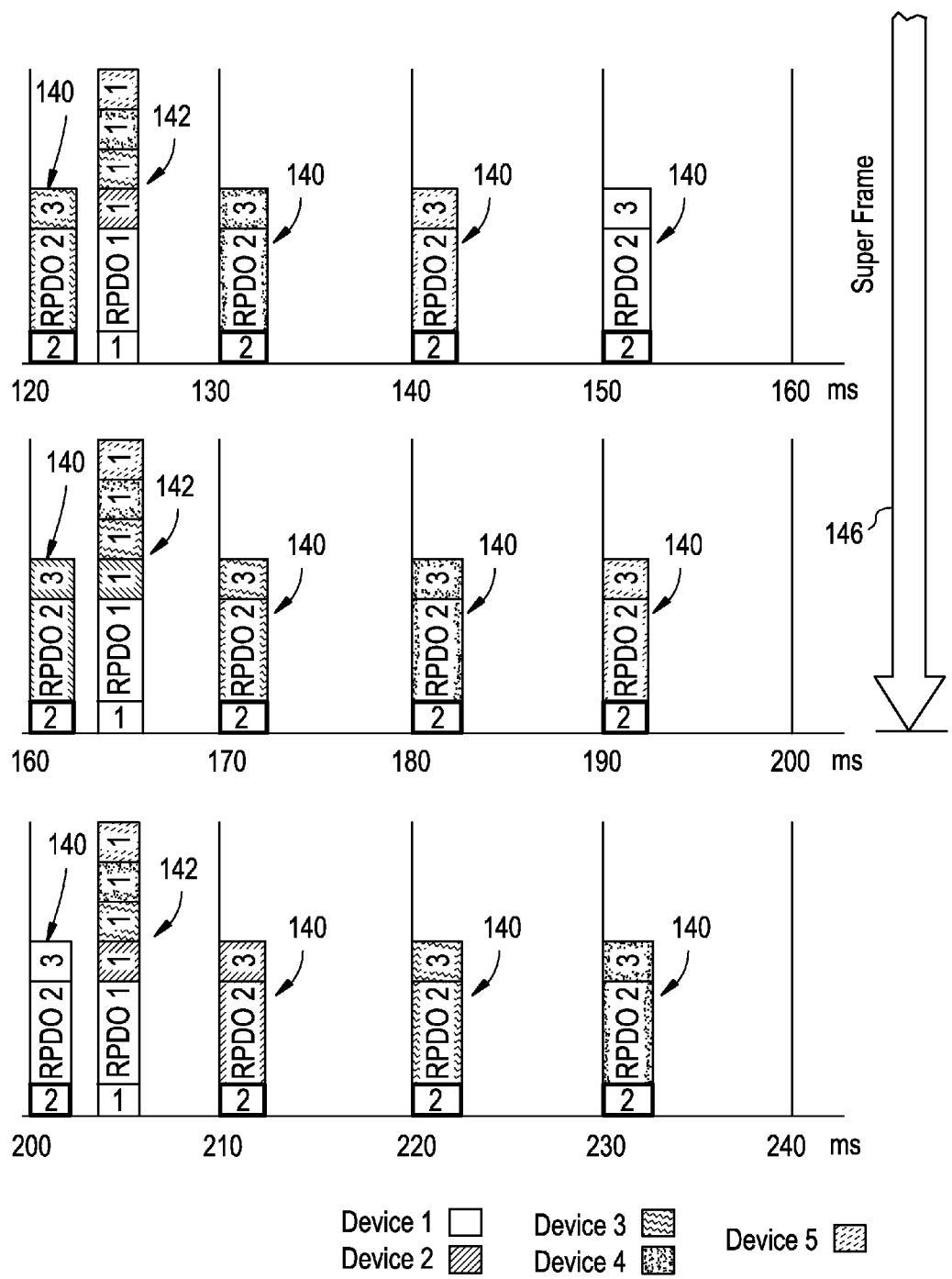

Turning now to FIGS. 3A-3B, an exemplary illustration of another RPDO transmitting schedule is illustrated. In the embodiment as shown, the fieldbus system 10 employs five different fieldbus devices 20. RPDO1 is a high priority RPDO 142. RPDO2 and RPDO3 are low priority RPDOs that are indicated by reference number 140. In the exemplary embodiment as shown in FIGS. 3A-3B, the frame rate is about 10 ms. The minimum wait time for the low priority RPDOs 140 is about 10 ms. FIGS. 3A-3B illustrate all of the low priority RPDOs 140 having the same minimum wait time. The superframe 146 is about 200 ms. FIGS. 3A-3B also illustrates the high priority RPDOs 142 with an offset of about 3 ms, and the low priority RPDOs 40 with an offset of about 0 ms. The high priority RPDOs 142 are illustrated as thread 1, and the low priority RPDOs 140 are illustrated as thread 2. It should be noted that unlike the embodiment illustrated in FIG. 2, FIGS. 3A-3B illustrates the low priority RPDOs 40 for a single fieldbus device 20 being transmitted in multiple slices during a superframe 146.

In yet another embodiment, an RPDO transmitting schedule with only low priority RPDOs and no high priority RPDOs may be employed as well. Turning now to FIG. 4, a transmitting schedule employing only low priority RPDOs 240 is illustrated. In the exemplary embodiment as shown, the fieldbus system 10 employs three different fieldbus devices 20, where RPDO1 and RPDO2 are low priority RPDOs that are indicated by reference number 240. All three of the fieldbus devices 20 receive RPDO1, and two of the fieldbus devices 20 receive RPDO2. The frame rate is about 10 ms. In the embodiment as shown in FIG. 4, the frame rate is the rate at which a single low priority RPDO 240 is transmitted, and is defined as the base execution rate of the application. The minimum wait time for low priority RPDO1 is about 10 ms, and is referred to as thread 1. The minimum wait time for low priority RPDO2 is about 20 ms, and is referred to as thread 2. The superframe 146 is about 120 ms. RPDO1 includes an offset of about 0 ms, and RPDO2 includes an offset of about 0 ms.

The scheduling algorithm output examples as illustrated in each of FIGS. 2-4 may be specified by the configuration tool 30 as a reconfiguration of the controller 22 without changing the firmware in the controller 22. Currently, in one approach, a controller typically requires a firmware change each time the specific CANopen configuration or the production equipment is modified. However, changing the firmware in the controller each time the CANopen configuration or the production equipment is modified may become time consuming and may also be costly. Thus, the scheduling algorithm allows for increased efficiency and reduced cost. Moreover, the scheduling algorithm also allows for the specific data files 34 (shown in FIG. 1) to be loaded to the configuration tool 30 once, where a user then defines the specific fieldbus device 20 that are employed within the fieldbus system 10. Thus, the configuration tool 30 does not typically need to be re-programmed with a new data file 34 if the number or type of fieldbus devices 20 in the fieldbus system 10 changes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fieldbus system, comprising:
a plurality of fieldbus devices;
a controller in communication with the plurality of fieldbus devices through a fieldbus, the controller transmitting a plurality of high priority Receive Process Data Objects (RPDOs) and a plurality of low priority RPDOs to the plurality of fieldbus devices through the fieldbus, the controller including:
a control logic for sending each of the plurality of fieldbus devices one of the plurality of high priority RPDOs during a frame, the frame being the fastest rate at which the plurality of high priority RPDOs are transmitted;
a control logic for sending at least one of the plurality of fieldbus devices at least one of the plurality of low priority RPDOs, the plurality of low priority RPDOs being transmitted after a minimum wait time;
a control logic for defining at least one low priority thread, the at least one low priority thread being the plurality of low priority RPDOs that share the same minimum wait time;
a control logic for preventing the at least one low priority thread from being sent more than once during a frame; and
a control logic for allowing each of the at least one low priority threads to complete at least once during a superframe, each of the at least one low priority threads completing at least once during the superframe;
wherein the superframe is defined as a number of frames needed to allow for each of the at least one low priority threads to complete at least once;
wherein the number of frames in the superframe is based on a number of the plurality of fieldbus devices with the plurality of low priority RPDOs that share the same minimum wait time, a frame rate in ms, the minimum wait time of the plurality of low priority RPDOs in ms, and a number of different minimum wait times between each of the plurality of fieldbus devices; and
wherein the number of frames in the superframe is calculated by the following formula:

$$n_s = \left\{ \left[ LCM\left(\frac{p_{frame}}{p_{MinWait1}}, d_{MinWait1}\right) \Big/ \frac{p_{Frame}}{p_{MinWait1}} \right], \ldots, \left[ LCM\left(\frac{p_{frame}}{p_{MinWait_i}}, d_{MinWait_i}\right) \Big/ \frac{p_{Frame}}{p_{MinWait_i}} \right] \right\}$$

wherein $n_s$ is the number of frames in the superframe, $d_{MinWait}$ is the number of the plurality of fieldbus devices with the plurality of low priority RPDOs that share the same minimum wait time, $p_{frame}$ is the frame rate in ms, $p_{MinWait}$ is the minimum wait time of the plurality of low priority RPDOs in ms, i is the number of different minimum wait times between each of the plurality of fieldbus devices, and a least common multiple LCM is of $p_{frame}$ divided by $p_{MinWait}$, and $p_{frame}$ divided by $d_{MinWait}$.

2. The fieldbus system of claim 1, wherein the plurality of low priority RPDOs are sent to each of the plurality of fieldbus devices one at a time in a round-robin configuration.

3. The fieldbus system of claim 1, further comprising a configuration tool including control logic for transferring at least one configuration file to the controller.

4. The fieldbus system of claim 3, wherein the configuration tool includes an interface for receiving an input that defines the plurality of fieldbus devices that are included with the fieldbus system.

5. The fieldbus system of claim 4, wherein the configuration tool includes control logic for generating the at least one configuration file based on the input from the interface and a data file that contains information regarding all possible configurations for the plurality of fieldbus devices potentially supported by the fieldbus system.

6. The fieldbus system of claim 1, wherein a CANopen data protocol is used for communication between the controller and the plurality of fieldbus devices.

7. The fieldbus system of claim 1, wherein the plurality of fieldbus devices are fuel valves for a gas turbine.

8. A fieldbus system, comprising:
a plurality of fieldbus devices;
a controller in communication with the plurality of fieldbus devices though a fieldbus where a CANopen data protocol is used for communication between the controller and the plurality of fieldbus devices, the controller transmitting a plurality of high priority Receive Process Data Objects (RPDOs) and a plurality of low priority RPDOs to the plurality of fieldbus devices through the fieldbus, the controller including:
a control logic for sending each of the plurality of fieldbus devices one of the plurality of high priority RPDOs during a frame, the frame being the fastest rate at which the plurality of high priority RPDOs are transmitted;
a control logic for sending at least one of the plurality of fieldbus devices at least one of the plurality of low priority RPDOs, the plurality of low priority RPDOs being transmitted after a minimum wait time;
a control logic for defining at least one low priority thread, the at least one low priority thread being the plurality of low priority RPDOs that share the same minimum wait time;
a control logic for preventing the at least one low priority thread from being sent more than once during a frame; and
a control logic for allowing each of the at least one low priority threads to complete at least once during a superframe, the superframe being a number of frames needed to allow for each of the at least one low priority threads to complete at least once, and each of the at least one low priority threads completing at least once during the superframe
wherein the number of frames in the superframe is based on a number of the plurality of fieldbus devices with the plurality of low priority RPDOs that share the same minimum wait time, a frame rate in ms, the minimum wait time of the plurality of low priority RPDOs in ms, and a number of different minimum wait times between each of the plurality of fieldbus devices; and
wherein the number of frames in the superframe is calculated by the following formula:

$$n_s = \left\{ \left[ LCM\left(\frac{p_{frame}}{p_{MinWait1}}, d_{MinWait1}\right) \middle/ \frac{p_{Frame}}{p_{MinWait1}} \right], \ldots, \left[ LCM\left(\frac{p_{frame}}{p_{MinWait_i}}, d_{MinWait_i}\right) \middle/ \frac{p_{Frame}}{p_{MinWait_i}} \right] \right\}$$

wherein $n_s$ is the number of frames in the superframe, $d_{MinWait}$ is the number of the plurality of fieldbus devices with the plurality of low priority RPDOs that share the same minimum wait time, $p_{frame}$ is the frame rate in ms, $p_{MinWait}$ is the minimum wait time of the plurality of low priority RPDOs in ms, i is the number of different minimum wait times between each of the plurality of fieldbus devices, and a least common multiple LCM is of $p_{frame}$ divided by $p_{MinWait}$, and $p_{frame}$ divided by $d_{MinWait}$.

9. The fieldbus system of claim 8, wherein the plurality of low priority RPDOs are sent to each of the plurality of fieldbus devices one at a time in a round-robin configuration.

10. The fieldbus system of claim 8, further comprising a configuration tool including control logic for transferring at least one configuration file to the controller.

11. The fieldbus system of claim 10, wherein the configuration tool includes an interface for receiving an input that defines the plurality of fieldbus devices that are included with the fieldbus system.

12. The fieldbus system of claim 11, wherein the configuration tool includes control logic for generating the at least one configuration file based on the input from the interface and a data file that contains information regarding all possible configurations for the plurality of fieldbus devices potentially supported by the fieldbus system.

13. The fieldbus system of claim 8, wherein the plurality of fieldbus devices are fuel valves for a gas turbine.

* * * * *